United States Patent
Hauser et al.

(10) Patent No.: US 9,599,170 B1
(45) Date of Patent: *Mar. 21, 2017

(54) ELECTRIC MOTOR CLUTCH/BRAKE ASSEMBLY

(71) Applicant: Hydro-Gear Limited Partnership, Sullivan, IL (US)

(72) Inventors: Raymond Hauser, Sullivan, IL (US); Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,530

(22) Filed: Aug. 3, 2015

Related U.S. Application Data

(63) Continuation of application No. 14/143,765, filed on Dec. 30, 2013, now Pat. No. 9,097,288, which is a
(Continued)

(51) Int. Cl.
*F16D 13/56* (2006.01)
*H02K 7/102* (2006.01)
(Continued)

(52) U.S. Cl.
CPC ............ *F16D 27/112* (2013.01); *F16D 65/18* (2013.01); *H02K 7/1025* (2013.01); *H02K 7/1085* (2013.01)

(58) Field of Classification Search
CPC .... A01D 34/006; A01D 34/828; B60K 28/10; F16D 13/56; F16D 13/26; F16D 55/02; F16D 59/02; F16D 27/112; F16D 65/18; H02K 7/1025; H02K 7/1085; H02K 7/14; H02K 2201/06; H02K 2201/03;
(Continued)

(56) References Cited

U.S. PATENT DOCUMENTS 2,408,808 A   10/1946   Paulus et al.
2,462,657 A   2/1949    McNairy
(Continued)

FOREIGN PATENT DOCUMENTS

EP   0072610 A2   2/1983

OTHER PUBLICATIONS

Brushless DC Electric Motor, Wikipedia, Nov. 14, 2008, pp. 1-5, http://en.wikipedia .org/wiki/Brushless_DC_motor.
(Continued)

*Primary Examiner* — Robert Pezzuto
(74) *Attorney, Agent, or Firm* — Neal, Gerber & Eisenberg LLP

(57) ABSTRACT

A clutch/brake assembly is provided which includes a coil plate non-rotatably captured between the upper housing and the lower housing and having affixed thereon a ring shaped coil, a clutch rotor rotatably secured to the shaft and having a groove configured to accommodate therein the ring shaped coil, and a clutch output assembly having a clutch/brake disc and a clutch output shaft. The clutch/brake disc and the clutch output shaft are attached to one another by a plurality of springs. The clutch/brake assembly may be mounted on a deck of a lawnmower to drive a blade.

19 Claims, 6 Drawing Sheets

Related U.S. Application Data continuation of application No. 13/164,544, filed on Jun. 20, 2011, now Pat. No. 8,615,976.

(60) Provisional application No. 61/356,937, filed on Jun. 21, 2010.

(51) Int. Cl.
  *F16D 27/112* (2006.01)
  *H02K 7/108* (2006.01)
  *F16D 65/18* (2006.01)

(58) Field of Classification Search
  CPC  H02K 1/06; H02K 1/28; H02K 5/225; H02K 5/06; H02K 7/1125; H02K 7/112
  USPC .......... 56/6, 7, 10.2 A–10.2 F, 10.2 R, 10.8, 56/10.6, 17.5, 11.9; 172/2–11; 180/65.1, 180/65.6, 165, 167, 210, 291, 292; 318/34, 625; 310/50, 88, 89, 67 R; 192/66.23, 110 B, 82 R, 93 A, 14, 84.1, 192/18 B
  See application file for complete search history.

(56) References Cited

U.S. PATENT DOCUMENTS

| | | |
|---|---|---|
| 2,489,584 A | 11/1949 | Miller |
| 2,510,917 A | 6/1950 | Turner et al. |
| 2,605,651 A | 8/1952 | Winther |
| 2,878,911 A | 3/1959 | Penney et al. |
| 3,246,725 A | 4/1966 | Brashear, Jr. |
| 3,256,963 A | 6/1966 | Hurst |
| 3,280,352 A | 10/1966 | Chapman |
| 3,344,292 A | 9/1967 | Hurst |
| 3,387,157 A | 6/1968 | Cook et al. |
| 3,487,438 A | 12/1969 | Becker et al. |
| 3,493,796 A | 2/1970 | Siegel |
| 3,582,697 A * | 6/1971 | Bochan ................ H02K 7/1085 192/84.94 |
| 3,587,797 A | 6/1971 | Szekely et al. |
| 3,589,485 A * | 6/1971 | Kajitani ................. F16D 55/02 192/12 B |
| 3,641,749 A * | 2/1972 | Dwyer, Jr. ......... A01D 34/6806 56/17.5 |
| 3,732,447 A | 5/1973 | Perhats |
| 3,750,781 A | 8/1973 | Lengsfeld |
| 3,886,255 A | 5/1975 | Noly |
| 3,893,191 A | 7/1975 | Gold et al. |
| 4,135,612 A | 1/1979 | Lengsfeld |
| 4,585,115 A | 4/1986 | Lindblom et al. |
| 4,640,397 A | 2/1987 | Santalini |
| 4,687,461 A | 8/1987 | Palloch et al. |
| 4,709,794 A | 12/1987 | Lengsfeld et al. |
| 4,712,660 A | 12/1987 | Erndt et al. |
| 4,761,576 A | 8/1988 | Savage |
| 4,823,926 A | 4/1989 | Wittler et al. |
| 5,195,623 A | 3/1993 | Sommer |
| 5,209,085 A | 5/1993 | Brien |
| 5,529,157 A | 6/1996 | Desrochers |
| 5,971,121 A | 10/1999 | Pardee |
| 6,047,805 A | 4/2000 | Nyquist et al. |
| 6,948,299 B2 | 9/2005 | Osborne |
| 6,952,064 B2 | 10/2005 | Hiwaki et al. |
| 7,311,184 B2 | 12/2007 | Patridge |
| 7,345,395 B2 | 3/2008 | Imai et al. |
| 7,355,310 B2 | 4/2008 | Kashihara et al. |
| 7,372,183 B2 | 5/2008 | Sasaki et al. |
| 8,207,693 B2 | 6/2012 | Hauser et al. |
| 8,227,948 B1 | 7/2012 | Fox et al. |
| 8,240,414 B2 | 8/2012 | Sasahara et al. |
| 8,381,853 B2 | 2/2013 | Iwaki et al. |
| 2008/0100238 A1 | 5/2008 | Shaw |
| 2008/0121443 A1 | 5/2008 | Clark et al. |
| 2008/0135313 A1 | 6/2008 | Onderko et al. |
| 2008/0234096 A1 | 9/2008 | Joshi et al. |
| 2009/0000839 A1 | 1/2009 | Ishii et al. |

OTHER PUBLICATIONS

Electric Motor, Wikipedia, Nov. 14, 2008, pp. 1-8, http://en/wikipedia/org/wiki/Electric_motor.
Induction Motor, Wikipedia, Nov. 14, 2008, pp. 1-5, http://en/wikipedia.org/wiki/Induction_motor.
Kondo, Minoru, Application of Permanent Magnet Synchronous Motor to Driving Railway Vehicles, Railway Technology Avalanche, No. 1., Jan. 1, 2003, p. 6.
Permanent Magnet Synchronous Motor, Nov. 14, 2008, p. 1, http://www.freescale.com/webapp/sps/site/overview.jsp?nodelID=02430ZnQXGrr1PZL81.
Electromagnetic Clutches & Brakes, obtained from web page <http://www.idicb.com/slb-sob.asp> on Oct. 20, 2015 (2 pp.).
Warner Electric Brochure, "Packaged Electromagnetic Clutches/Brakes," GEN2 Phase 4, Sep. 2007 (67 pp.).
VSAU Self-Adjusting EM Clutch/Brake Unit, obtained from web page <http://ogura-clutch.com/products.php?category=2&product=97&sort=3#lightbox/0/> on Nov. 16, 2015 (1 p.).

\* cited by examiner

ELECTRIC MOTOR CLUTCH/BRAKE ASSEMBLY

CROSS REFERENCE

This application is a continuation U.S. patent application Ser. No. 14/143,765, filed on Dec. 30, 2013, which is a continuation of U.S. patent application Ser. No. 13/164,544, filed on Jun. 20, 2011, and issued on Dec. 31, 2013 as U.S. Pat. No. 8,615,976, which claims the benefit of U.S. Provisional Patent Application No. 61/356,937 filed on Jun. 21, 2010. The contents of these prior applications are incorporated herein by reference.

TECHNICAL FIELD

This disclosure is generally related to electric motor construction, and more particularly, to electric motor assemblies employed in utility vehicles and powered walk-behind equipment, such as lawn and garden tractors, mowers, and the like. The disclosed motor assembly includes a clutch/brake assembly which is substantially enclosed within the motor assembly housing. This clutch/brake motor assembly may be used to selectively engage and drive various auxiliary power devices and work implements of a vehicle or other powered equipment.

BACKGROUND OF THE INVENTION

Operators of electrically powered equipment, due to their familiarity with high powered, combustion engine-driven equipment, have become accustomed to and expect nearly instantaneous high power and torque availability when performing work. A mowing deck, for example, typically includes one or more blades which may be directly driven by electric motors.

In many instances, industry expectations dictate that the blade(s) ramp up to an effective cutting speed within approximately two seconds. Substantial torque is required to overcome blade inertia and motion resistance applied to the blade(s) by, for example, thick and/or tall vegetation. Inertia and motion resistance hamper the ability of the relatively small deck motor(s) to ramp up to an effective cutting speed within an operator-perceived acceptable length of time. The addition of these desirable performance features to electric motors typically translates into increased motor sizes and power consumptions, both of which go counter to motor characteristics sought by equipment designers or manufacturers.

Many commercial and consumer mowers often comprise a deck drive system using belts and pulleys driven by a combustion engine and typically utilize an electric clutch/brake to drive and stop the blade(s) of the mowing deck. It would be advantageous to reduce the number of moving parts, which would translate into reduced manufacturing costs, reduced equipment maintenance costs, improved design flexibility, space savings and simplicity in configuring equipment, and weight reduction in some configurations.

Due to their relatively high power capacity, three-phase AC electric motors may be used in utility vehicles or other powered equipment to drive work implements. These electric motors are typically powered by an on-board power source, such as a battery pack or array of batteries. These batteries may be the only source of power or the primary source of power or may be a secondary source of power, depending on vehicle or equipment configuration. In any case, power availability and consumption rate is an increasingly important design concern. AC induction motors, and Permanent Magnet Synchronous (PMS) motors in particular, can be employed advantageously in a variety of utility vehicle applications due to power capacity and their ability to be rapidly accelerated and decelerated.

Therefore, there is a need for an electric motor that includes a clutch/brake assembly having the ability to accelerate and decelerate to targeted speeds within desirable lengths of time, and providing additional benefits to both the operator and manufacturer.

SUMMARY OF THE INVENTION

The present invention comprises an electric motor having a clutch/brake. It is preferably designed for use in performing auxiliary work functions of a utility vehicle or other powered equipment. This electric motor assembly is disclosed herein for use with a simplified mowing deck for illustrative purposes. It will be apparent to those skilled in the art that the electric motor assembly discussed herein can be utilized in a variety of other configurations and contexts.

While not limited to a specific type of electric motor, the motor shown is an AC permanent magnet synchronous (PMS) motor. Aspects of the present invention may be applied to other motor types as well, including brushless direct current (BLDC), AC synchronous, AC induction, integrated permanent magnet (IPM), switched reluctance, stepper, or slotless brushless type permanent magnet motors. The disclosed invention may also comprise a brushed DC motor, which has the advantage of requiring simpler, less expensive electrical control.

Features of the disclosed electric motor include a clutch/brake assembly, which includes a coil plate non-rotatably captured between an upper motor housing and a lower motor housing and having affixed thereon a ring shaped coil, a clutch rotor rotatably secured to a motor shaft and having a U-shaped circular groove configured to accommodate therein the ring shaped coil, and a clutch output assembly having a clutch/brake disc and a clutch output shaft. The clutch/brake disc and the clutch output shaft are preferably attached to one another by a plurality of springs.

A better understanding of the objects, advantages, features, properties and relationships of the invention will be obtained from the following detailed description and accompanying drawings which set forth one or more illustrative embodiments and are indicative of the various ways in which the principles of the invention may be employed.

DETAILED DESCRIPTION OF THE DRAWINGS

Figure 1:
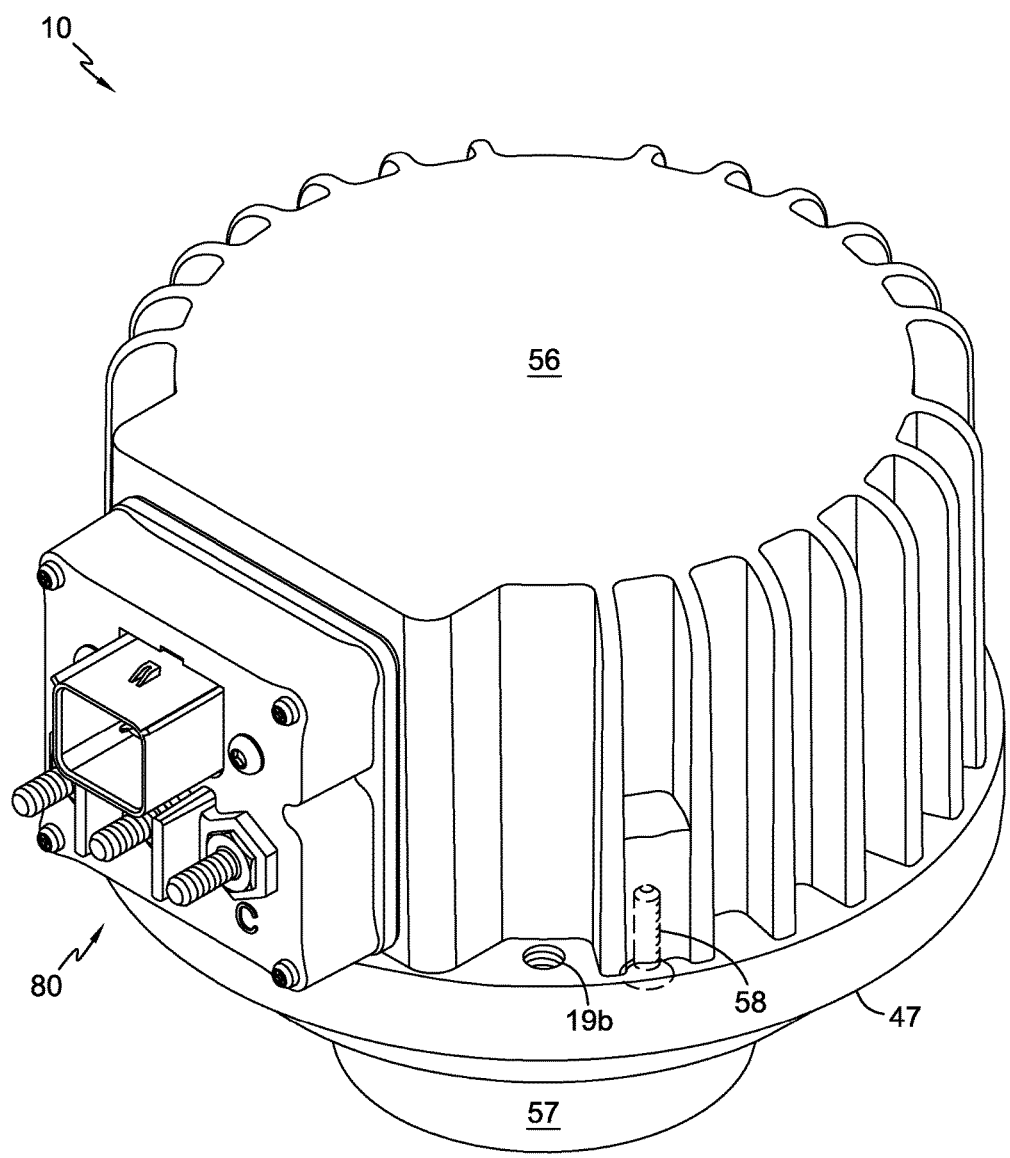
FIG. 1 is a perspective view of an embodiment of an electric motor in accordance with the present invention.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also other embodiments that may come to mind in accordance with these principles. The scope of the present invention is intended to cover all such embodiments that may fall within the scope of the appended claims, either literally or under the doctrine of equivalents.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art. It will further be understood that, although terms such as "upper", "lower", etc., are used herein to facilitate understanding and provide orientation when viewing the illustrations provided, the motor assembly embodiments disclosed herein are sealed units which may be oriented at any angle, as determined by the utility vehicle or other powered equipment configuration in which they are utilized.

The present invention provides an electric motor having a substantially enclosed clutch/brake assembly, which is preferably substantially enclosed within a motor housing. By enclosing the clutch/brake assembly in a common housing with the electric motor, deck drive components such as the traditional belts and pulleys, the separate electric clutch/brake and a number of other items, such as belt guards, belt tensioners, fasteners, etc., can be eliminated. The result is fewer moving parts, reduced manufacturing costs, reduced equipment maintenance costs, improved design flexibility, space savings and simplicity in configuring equipment, and weight reduction in some configurations. By allowing the electric motor of a deck mower, for example, to achieve high speed before engaging its associated and commonly housed clutch, high torque is instantly transmitted to rapidly rotate the attached blades in order to provide a quick speed ramp-up of the blades to an effective cutting speed which operators expect and equipment manufacturers may require. The clutch/brake motor assembly disclosed herein is illustrated with a particular PMS motor design, but is not limited to this type of motor. Any appropriate electric motor design with power and operational characteristics suitable for a particular utility vehicle or equipment configuration may be substituted for the PMS motor portion of the disclosed invention with minor modifications which will be apparent to those skilled in the art.

FIGS. 1-5 illustrate an exemplary embodiment of an electric motor 10 including an integral clutch/brake assembly 30, in accordance with the principles of the present invention. Electric motor or electric motor/clutch/brake assembly 10 will be hereafter referred to as motor assembly 10. In a preferred embodiment, motor assembly 10 is preferably mounted on a mowing deck 12. Just as a variety of electric motor/clutch/brake assemblies may be utilized in utility vehicles or other powered equipment configurations to drive additional auxiliary work implements (blades, blowers, brooms, trimmer, auger, etc.) either directly or using belting and/or gearing arrangements, it will be understood that the motor assembly embodiments described herein may be employed across numerous vehicle or powered equipment configurations to directly or indirectly drive a wide variety of mechanical implements. It should further be noted that the motor/clutch/brake assembly embodiments disclosed herein may vary in size, input voltage and output power depending on vehicle or equipment configuration and load requirements. Therefore, it will be understood that the present invention is scalable and that various utility vehicle or other powered equipment configurations may incorporate motor/clutch/brake assemblies of differing sizes to meet specific load requirements.

Figure 2:
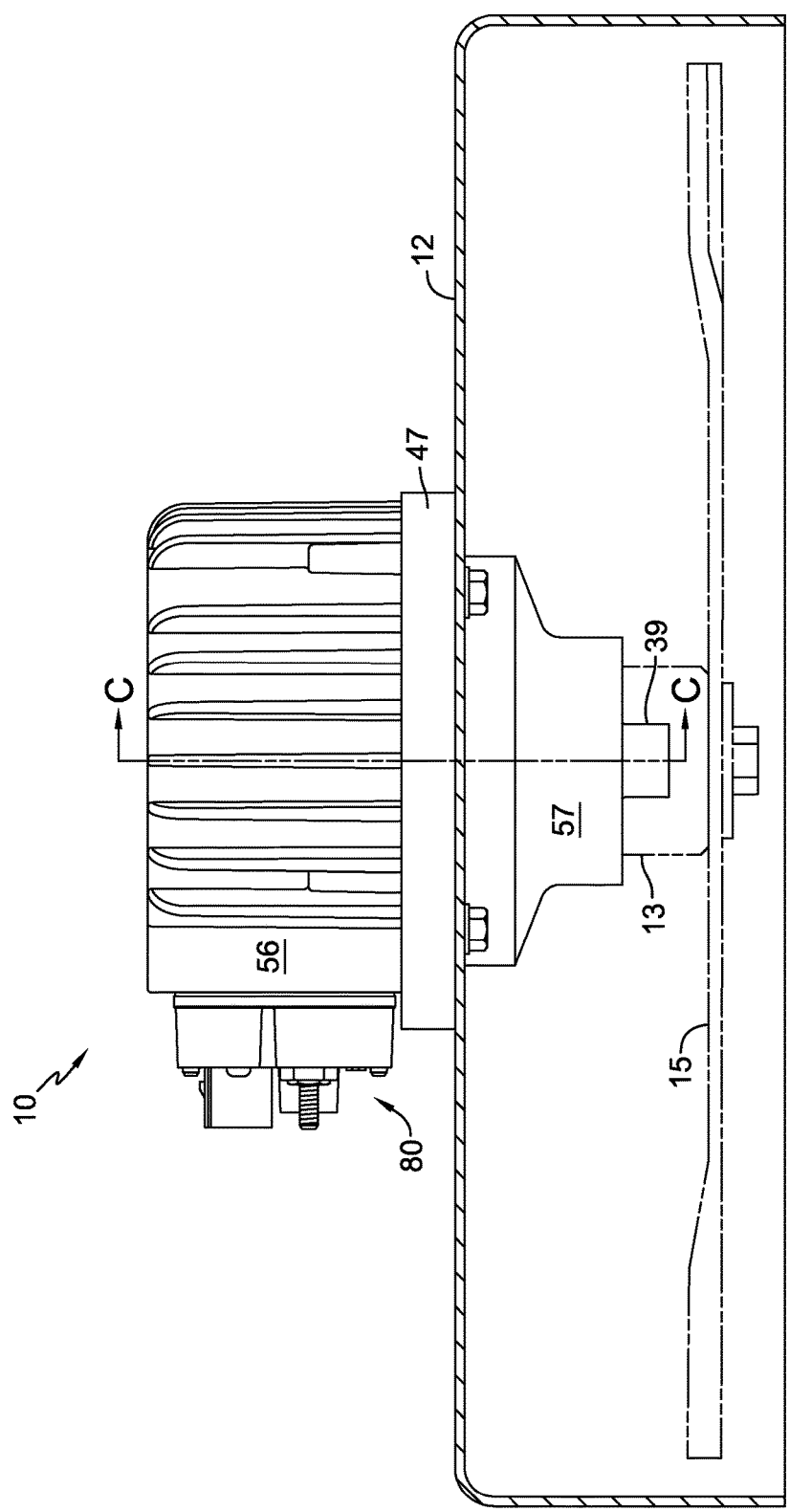
FIG. 2 is an elevational view comprising the embodiment shown in FIG. 1.

In a particular embodiment, as shown in FIGS. 1-5, motor assembly 10 includes an upper housing 56 and a lower housing 57. A terminal box assembly 80 is sealingly fixed to one side of upper housing 56. The basically cup-shaped upper housing 56 includes a plurality of threaded cavities around its perimeter for attaching lower housing 57 using a plurality of fasteners 58. In other embodiments, other known suitable methods of fastening upper housing 56 and lower housing 57 together may be used. The lower housing 57 includes a mounting flange 47 which includes a plurality of holes 19a (shown best in FIG. 4), through which fasteners 58 extend to secure the upper and lower housings 56 and 57 together. Mounting flange 47 also includes a plurality of holes 19b around its perimeter for attaching motor assembly 10 to a mowing deck 12, for example, as shown in FIG. 2. In an alternative embodiment, flange 47 may include countersink or counterbore features (not shown) to receive the heads of housing fasteners 58 so flange 47 can be flush-mounted on mowing deck 12. It will be understood that the size, number of and/or positioning of the holes 19a, fasteners 58, and mounting holes 19b may vary between embodiments and do not limit the design disclosed herein. Additionally, it is contemplated that in some embodiments, mounting holes 19b may be threaded to receive screws or bolts. Some embodiments may utilize locknuts or lock washers and nuts to secure screws or bolts. Other embodiments may utilize carriage bolts to prevent bolts from turning while tightening nuts. Still other embodiments may utilize other fastening methods, such as riveting, for example.

Together, the upper and lower housings 56 and 57 form a two-piece, sealed housing designed to facilitate service and assembly, as well as provide protection for the internal components of motor assembly 10. Prior electric motor housing designs often utilize a three-piece housing construction consisting of a tube-shaped middle portion with a cap secured to each end. This configuration is generally known as "can construction" in the motor industry. The two-piece housing construction of the present invention provides for improved sealing and thermal conduction over such designs. The approximately central location of the plane of the mounting surface of flange 47 with respect to the motor assembly 10, which is preferably between the two ends of the axis of motor shaft 20, is particularly useful in achieving a low profile above the mounting surface of mowing deck 12. The contact area of the circular mounting flange 47 helps to improve heat dissipation, utilizing the deck on which motor assembly 10 is mounted as a heat sink. To further improve motor cooling, radial fins are included on the sides of upper housing 56. In the embodiment shown, both upper and lower housings 56 and 57 are cast aluminum. However, other materials such as steel or plastic, and other forming techniques, such as stamping or molding, may be used in other embodiments. As shown in FIGS. 1-2, terminal box assembly 80 is mounted on the side of upper housing 56 to achieve a low profile and efficient wiring routing between motor assembly 10 and a motor controller (not shown), for example. However, in alternative embodiments, terminal box 80 may be located on other surfaces of motor assembly 10. Also, portions of terminal box 80 may be integrally formed as part of upper housing 56.

Figure 3:
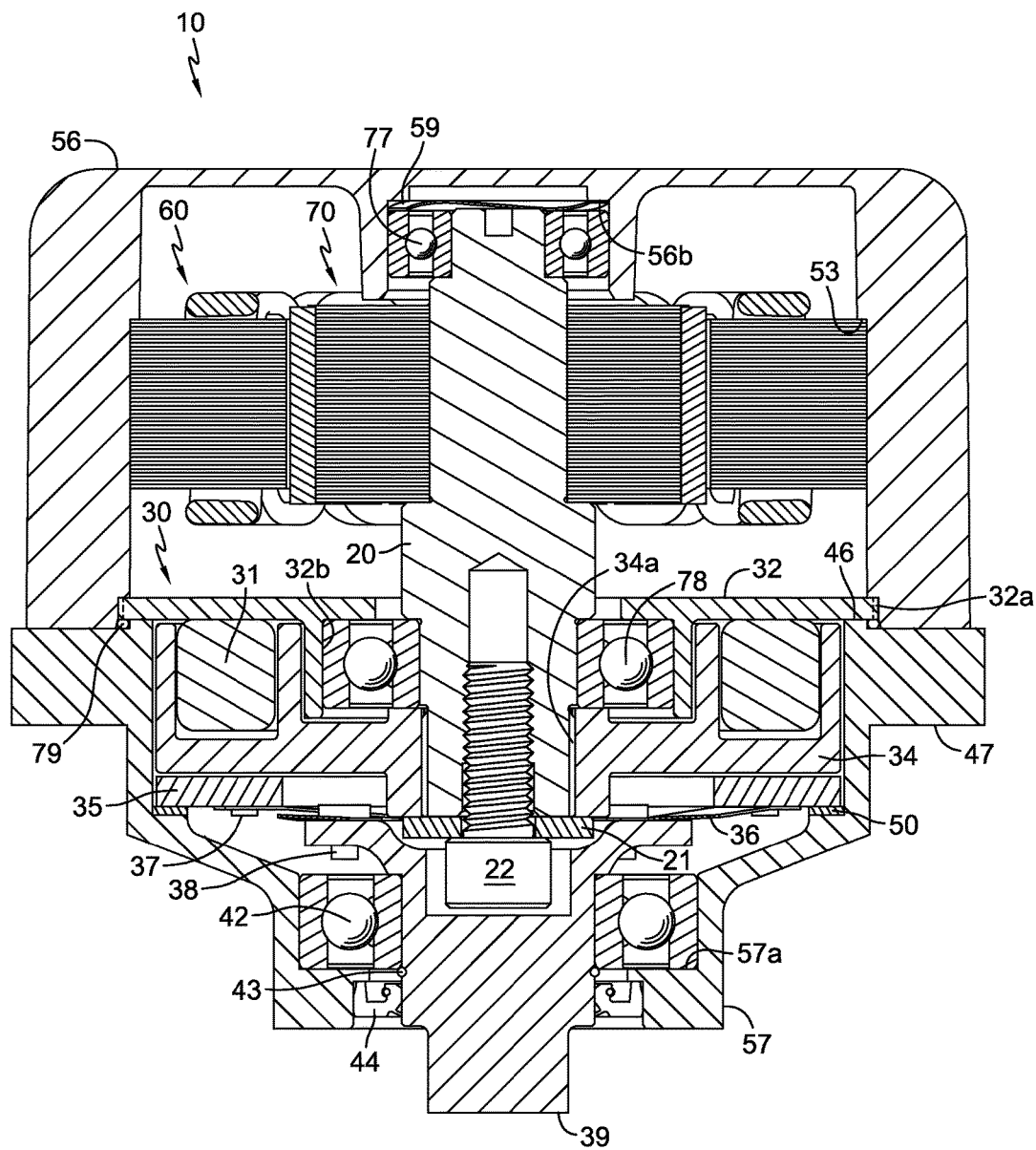
FIG. 3 is a cross-sectional view along the line C-C of FIG. 2.
Figure 4:
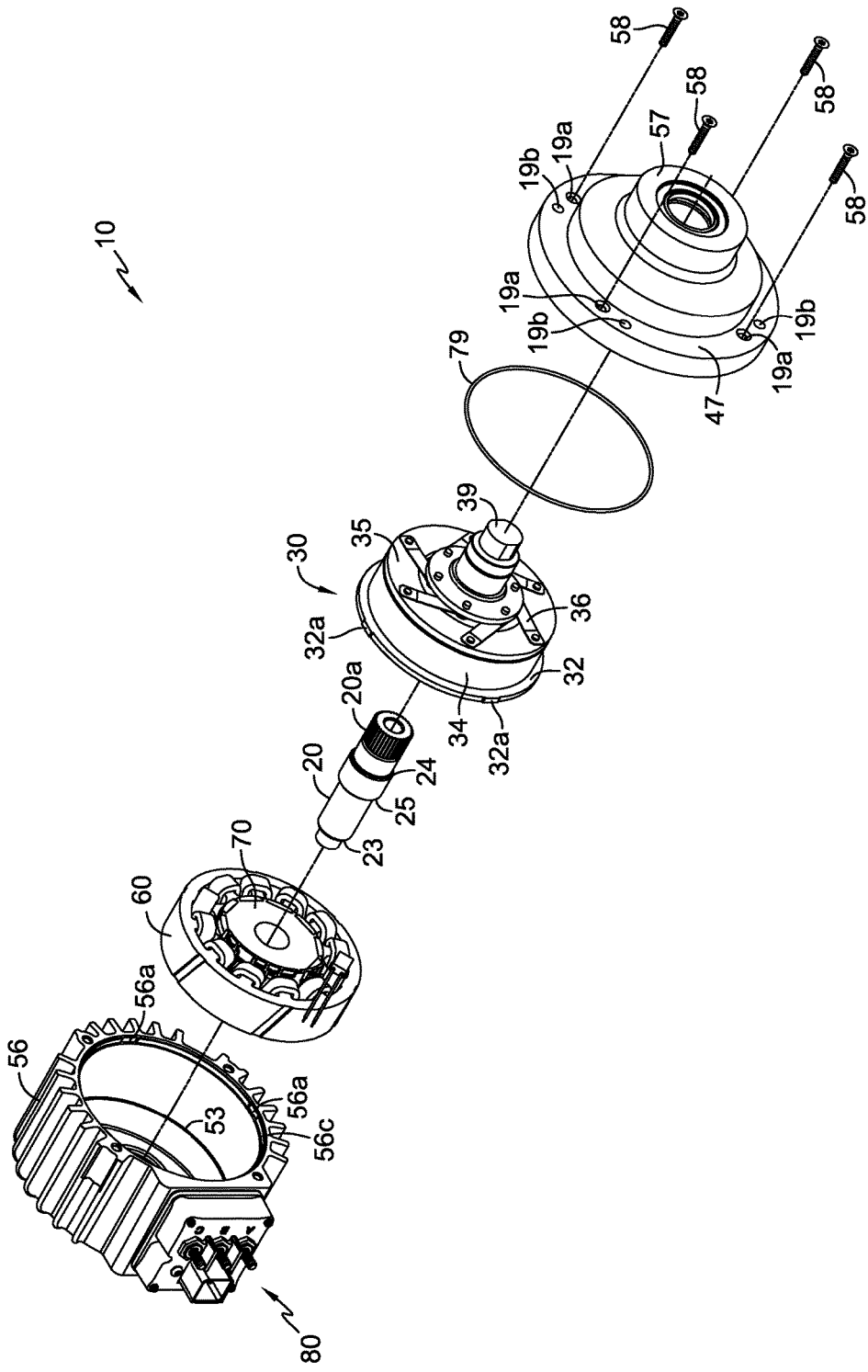
FIG. 4 is a partially exploded perspective view of the embodiment shown in FIG. 1.
Figure 5:
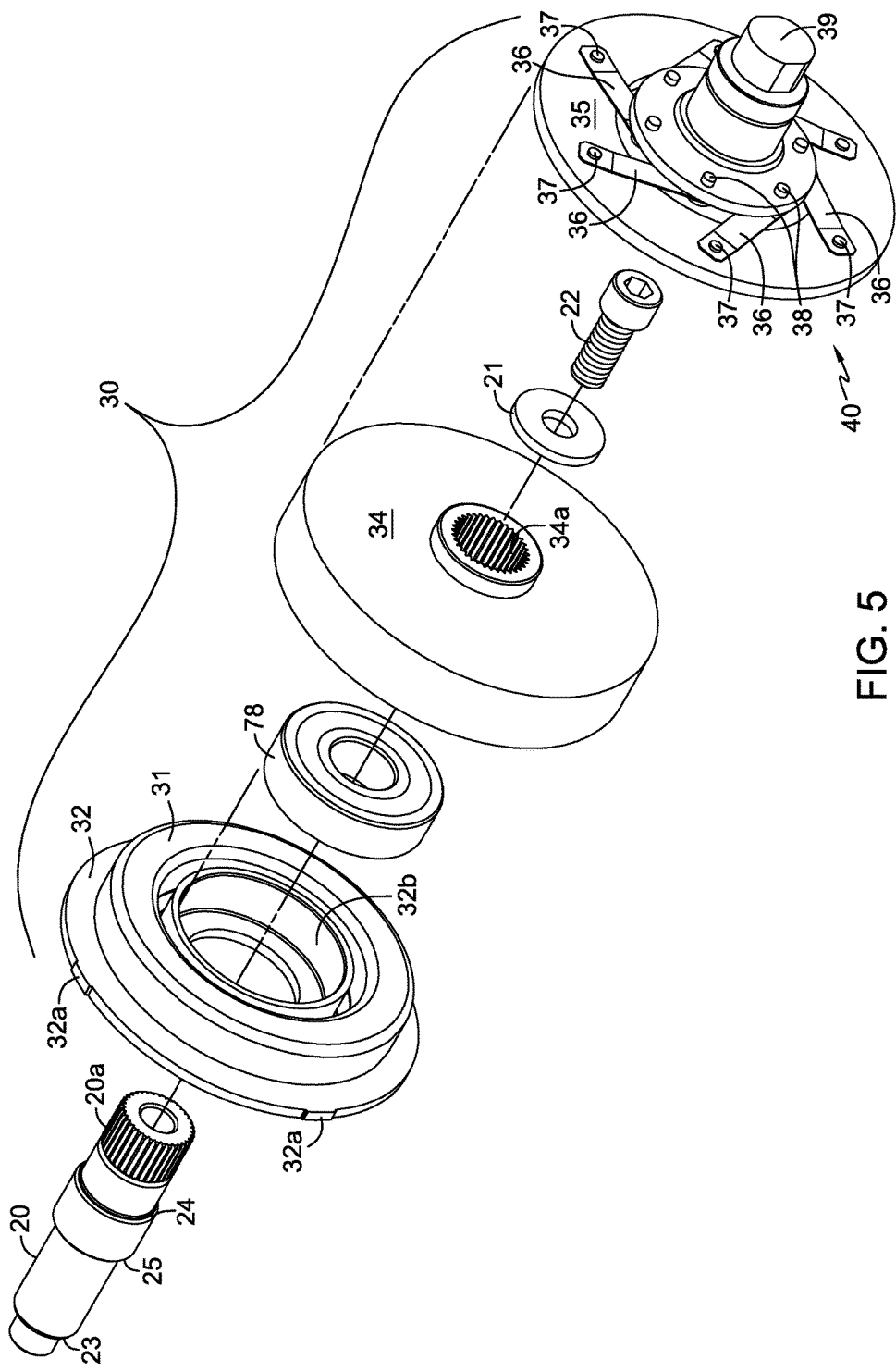
FIG. 5 is a partially exploded perspective view of the motor shaft and clutch/brake assembly shown in FIG. 4.

Now referring to FIGS. 3-5, motor assembly 10 also includes a motor shaft 20, a clutch/brake assembly 30, a stator assembly 60, a rotor assembly 70, an upper bearing 77, and a housing seal 79. Rotor assembly 70 fits inside the stator assembly 60 with an appropriate air gap between the rotor and stator to allow for free rotation of rotor assembly 70 relative to stator assembly 60. Stator assembly 60 is press-fit into upper housing 56 against a land or shoulder 53 formed in the upper housing inner wall. Shoulder 53 is configured to properly position stator assembly 60 within motor assembly 10. Upper housing 56 is heated for expansion and stator assembly 60 cooled for contraction prior to fitting stator assembly 60 into position. When upper housing 56 cools, it then contracts, tightly gripping stator assembly 60. While the demonstrated embodiment provides these various formed lands, shoulders, pockets, etc., to aid in locating components and suggests press-fit and slip-fit joints, it will be understood that other embodiments may utilize other means, such as tab and slot joints, adhesives, retaining rings, etc., as should be apparent to those skilled in the art. A combination of joining means may also be employed in some embodiments, as needed, in order to ensure secure joints between components. To withstand the torsional load requirements of motor assembly 10, motor shaft 20 may be formed by various means of any suitable rigid material, such as high strength steel, for example.

As shown in FIG. 5, clutch/brake assembly 30 comprises a coil plate 32, a coil 31, a clutch rotor 34, a washer 21, a screw 22, a clutch output shaft assembly 40, and a middle bearing 78. Clutch rotor 34 includes splines 34a which engage splines 20a of motor shaft 20, and has a circular groove to accommodate therein ring-shaped coil 31. Other slidable, non-rotatable interfaces may be employed in lieu of splines. Washer 21 and screw 22 are configured to secure clutch rotor 34 to motor shaft 20, thereby positioning clutch rotor 34 in its proper location relative to coil 31, which is fixedly joined to coil plate 32. Clutch output shaft assembly 40 comprises a clutch/brake disc 35, clutch/brake springs 36 and a clutch output shaft 39. Clutch/brake disc 35 is configured to frictionally engage, in the axial direction of motor shaft 20, with a brake wear ring 50, which is non-rotatably fixed to lower housing 57. Clutch/brake disc 35 is preferably made from a ferrous material or the like.

As best shown in FIG. 3, upper bearing 77 is press-fit onto the upper end of motor shaft 20 where it is positioned by an upper land or shoulder 23 of motor shaft 20. Middle bearing 78 is press-fit and/or otherwise retained in pocket 32b of coil plate 32. Upper bearing 77 may be separated from contact with the inside upper surface of pocket 56b by a biasing spacer or wave washer 59 in order to prevent possible bearing chatter and/or to provide positioning tolerance for motor shaft 20 and bearing 77. Upper bearing 77 and lower bearing 78 are of a well-known variety having an inner and outer ring or race separated by a plurality of ball bearings such that the inner race of each bearing can rotate relative to the outer race. In some embodiments, bearing 77 and/or 78 are of the sealed variety in order to help prolong bearing life by reducing contamination.

Referring back to FIG. 5, motor shaft 20 also comprises a middle land or shoulder 25 to position rotor assembly 70 on motor shaft 20, to which rotor assembly 70 is fixedly mounted, and a lower land or shoulder 24 that abuts against middle bearing 78, to facilitate positioning motor shaft 20 which is slip-fitted through middle bearing 78. The lower end of motor shaft 20 is slip-fit through middle bearing 78 so that the splines 20a of motor shaft 20 are positioned below middle bearing 78. As shown in FIGS. 2-3, clutch output shaft 39, which is slip fitted through a lower bearing 42, protrudes below lower housing 57. At its protruding end, clutch output shaft 39 may be connected to a hub or adapter 13 which can be used to secure an operable implement, such as blade 15. Lower bearing 42, which is also of a well-known variety having an inner and outer ring or race separated by a plurality of ball bearings such that the inner race of each bearing can rotate relative to the outer race, is press-fit and/or otherwise retained within a lower pocket 57a of lower housing 57. Lower bearing 42 can also be secured with a retaining ring (not shown) positioned above bearing 42, either in place of the press-fit operation or in addition to it. By positioning lower bearing 42 within pocket 57a near the driven load helps place the radial load imposed by mowing deck blades, for example, near lower bearing 42, thereby improving static and dynamic loading on the bearing, which enhances the life of the bearing. This positioning of lower bearing 42 also eliminates the possible need for a separate bearing external to the motor housing. A shaft seal 44 is positioned below lower bearing 42 to further seal motor assembly 10, thereby helping to extend the life of various internal components of motor assembly 10, particularly if bearing 42 is not of the sealed variety. A retaining ring 43 is positioned on shaft 39 below lower bearing 42 to prevent shaft 39 from moving upward during motor operation, thereby helping to maintain the proper positioning of disc 35 in relation to clutch rotor 34.

As shown in FIGS. 3-4, coil plate 32 is seated in recess 56c of upper housing 56 and abuts a rim 46 of lower housing 57, so that coil plate 32 is sandwiched between upper housing 56 and lower housing 57. Coil plate 32 includes along its circumference one or more tabs 32a that can interface with one or more slots 56a located in upper housing 56 to prevent rotation of coil plate 32 with respect to upper housing 56. It is understood to those skilled in the art that other anti-rotation means may be employed, such as adhesives or fasteners, for example. An upper surface of rim 46, which contacts a lower surface of coil plate 32, is preferably machined in order to ensure integrity of the housing seal and also to precisely locate the clutch components attached to motor shaft 20 so that clutch rotor 34 is positioned properly in relation to clutch/brake disc 35. Rim 46 is configured to add strength and stability to motor assembly 10 and to enhance the seal between upper housing 56 and lower housing 57 by properly locating and containing housing seal 79 and providing an overlapping joint with upper housing 56. Seal 79 is illustrated as an O-ring, but other types of seals are contemplated as well.

Referring back to FIG. 5, each of a plurality of springs 36 is attached at one end via a rivet 37 to clutch/brake disc 35 and at a longitudinally opposite end via a rivet 38 to clutch output shaft 39. Other fastening methods may be used in lieu of these rivets. Springs 36, which are illustrated as a flexible, flat metal strip in the embodiments shown, hold clutch/brake disc 35 and output shaft 39 in a braked, non-rotating position against brake wear ring 50 when clutch coil 31 is not energized. Depending on the material used to form lower housing 57, wear ring 50 may not be required in some embodiments.

During operation, once energized the stator assembly 60 produces a magnetic field that leads rotor assembly 70 to rotate along with motor shaft 20 and clutch rotor 34. When the rotational speed of rotor assembly 70 reaches a desirable or targeted rotation speed, clutch coil 31 is energized to electro-magnetically attract or pull clutch/brake disc 35 into contact with the rapidly spinning clutch rotor 34, to rotatably drive clutch/brake disc 35, which in turn drives output shaft 39. As clutch/brake disc 35 accelerates to catch up to the rotational speed of clutch rotor 34, rotational slipping between a face of clutch/brake disc 35 and an opposite face of clutch rotor 34 continues until their rotational speeds are substantially equal. The actual time to reach the same rotational speed is preferably short, e.g., between 1/200th of a second and 1 second. Disengagement of clutch rotor 34 from clutch/brake disc 35 begins once coil 31 is de-energized. The disengagement is accelerated by the natural spring force of springs 36 in combination with a friction force generated between a contact surface of clutch/brake disc 35 and the corresponding contact surface of wear ring 50 or housing 57. This force combination needs to be sufficient to bring rotating mowing deck blades 15 or other rotating loads to a stop within a desirably short length of time. A desirable or acceptable motor rotation speed prior to energizing coil 31 to initiate clutch engagement may be determined by the operator, by motor/clutch control software, by delayed electrical relay, or by other known control methods, as is deemed appropriate for the vehicle or equipment configuration in which motor assembly 10 is applied.

Figure 6:
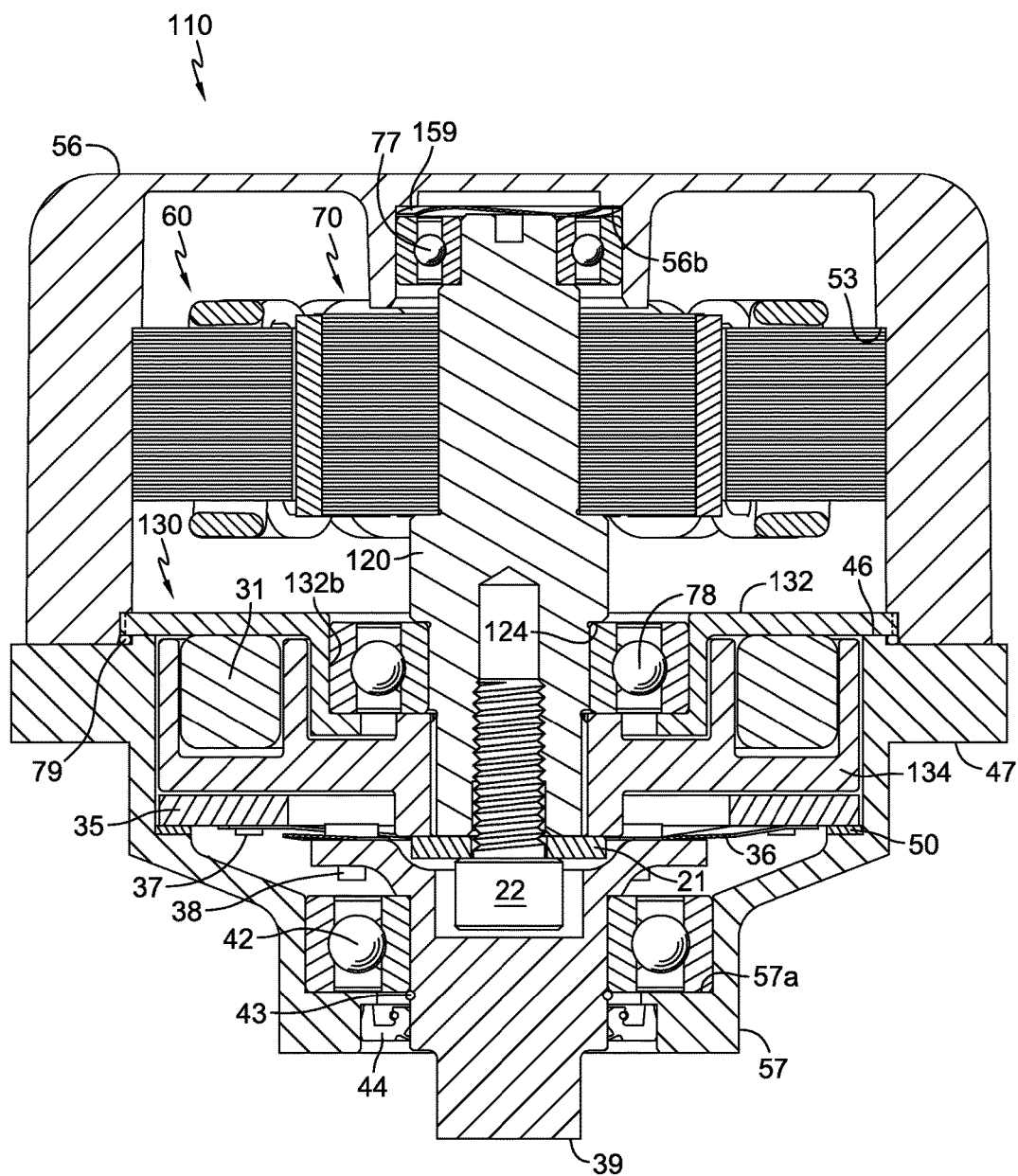
FIG. 6 is a cross-sectional view of an alternate embodiment of the present invention.

An alternative motor assembly embodiment 110 is depicted in FIG. 6. Motor assembly 110 comprises clutch/brake assembly 130, in which bearing 78 may be press-fit (not required) or slip-fit into pocket 132*b* of coil plate 132. In motor assembly 110, middle bearing 78 is installed from the top of the coil plate rather than from the bottom as shown in FIG. 3. In motor assembly 110, bearing 78 is sandwiched between plate 132 and shoulder 124 of motor shaft 120, therefore requiring no additional retention measures to keep bearing 78 in coil plate 132. Similar to the configuration of motor assembly 10 discusses above, upper bearing 77 may be separated from contact with the inside upper surface of pocket 56*b* by a biasing spacer or wave washer 159 in order to prevent possible bearing chatter and/or to provide positioning tolerance for shaft 120 and bearing 77. In motor assembly 110, however, the spring force imparted by wave washer 159 must additionally prevent bearing 78, shaft 120 and clutch rotor 134 from moving upward along the axis of shaft 120. Optionally, bearing 78 may be securely press-fit into pocket 132*b* and/or a retaining ring (not shown) may be added above bearing 78 to secure it within pocket 132*b*. Alternatively, wave washer 59 and wave washer 159 may be omitted from the depicted motor assemblies 10 and 110, respectively, with only minor modification to upper housing 56 to eliminate the vertical space or gap in pocket 56*b* where washer 59 or washer 159 is located.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof

What is claimed is:

1. A motor and clutch assembly, comprising:
   an electric motor;
   a motor shaft rotatably driven by the electric motor and having a first axis;
   a motor housing disposed about the electric motor;
   a clutch housing mounted to the motor housing to form an enclosure;
   a coil mounting member disposed in the enclosure;
   a electromagnetically energizable coil non-rotatably disposed on the coil mounting member;
   a clutch rotor disposed in the enclosure and mounted on and rotatably driven by the motor shaft;
   a clutch output shaft assembly comprising:
      an output shaft rotatably mounted in the clutch housing on the first axis, and
      a clutch/brake;
   a plurality of springs extending from the output shaft to the clutch/brake and connected to the output shaft and the clutch/brake, wherein the plurality of springs is flexed when the coil is energized.

2. The motor and clutch assembly of claim 1, further comprising a blade mounted on and rotatably driven by the output shaft.

3. The motor and clutch assembly of claim 1, wherein the clutch housing has a flange having a plurality of holes formed therein and configured for mounting the clutch housing on a utility vehicle.

4. The motor and clutch assembly of claim 1, further comprising a brake surface disposed on an interior surface of the clutch housing.

5. The motor and clutch assembly of claim 1, further comprising:
   a first bearing mounted in an end of the motor housing and rotatably receiving the motor shaft; and
   a second bearing mounted in a pocket in the coil mounting member and rotatably receiving the motor shaft.

6. The motor and clutch assembly of claim 5, wherein the motor shaft has a first shoulder and a second shoulder, wherein the first shoulder abuts the first bearing to limit axial movement of the motor shaft in a first direction and the second shoulder abuts the second bearing to limit axial movement of the motor shaft in a second direction opposite the first direction.

7. A motor and clutch assembly, comprising:
   an electric motor;
   a motor shaft rotatably driven by the electric motor and having a first axis;
   a motor housing disposed about the electric motor;
   a clutch housing mounted to the motor housing to form an enclosure;
   a coil mounting member disposed in the enclosure;
   a electromagnetically energizable coil non-rotatably disposed on the coil mounting member;
   a clutch rotor disposed in the enclosure and mounted on and rotatably driven by the motor shaft;
   a clutch output shaft assembly comprising:
      an output shaft rotatably mounted in the clutch housing on the first axis, and a clutch/brake;
   wherein:
      the coil is non-rotatably disposed on the coil mounting member; and
      the clutch rotor has a channel formed therein, wherein the coil is located in the channel.

8. The motor and clutch assembly of claim 7, further comprising a plurality of springs extending from the output shaft to the clutch/brake and connected to the output shaft and the clutch/brake, wherein the plurality of springs is flexed when the coil is energized.

9. The motor and clutch assembly of claim 7, further comprising a plurality of springs extending from the output shaft to the clutch/brake and connected to the output shaft and the clutch/brake, wherein the plurality of springs is flexed when the coil is energized.

10. The motor and clutch assembly of claim 9, further comprising a brake surface disposed on an interior surface of the clutch housing.

11. The motor and clutch assembly of claim 7, further comprising:
    a first bearing mounted in an end of the motor housing and rotatably receiving the motor shaft; and
    a second bearing mounted in a pocket in the coil mounting member and rotatably receiving the motor shaft.

12. An enclosed motor and clutch device comprising:
    a housing;
    an electric motor disposed in the housing;
    a motor shaft disposed in the housing, rotatably driven by the electric motor, and having a first axis;
    a electromagnetically energizable coil;
    a clutch rotor disposed in the housing and mounted on and rotatably driven by the motor shaft; and
    a clutch output shaft assembly comprising:
        an output shaft rotatably mounted in the housing on the first axis;
        a clutch/brake disposed in the housing; and
        a plurality of springs extending from the output shaft to the clutch/brake and connected to the output shaft and the clutch/brake;
        wherein the clutch/brake moves axially relative to the output shaft between a first position corresponding to a braking mode and a second position corresponding to a driving mode, wherein in the first position the clutch/brake is retained against a brake surface by a bias in the plurality of springs when the coil is not energized, and in the second position, the clutch/brake is retained against the clutch rotor and the plurality of springs is flexed when the coil is energized.

13. The enclosed motor and clutch device of claim 12, wherein the housing comprises:
    a lower housing having a radial flange forming a top surface defining a first plane; and
    an upper housing joined to the radial flange;
    wherein the first axis is perpendicular to the first plane.

14. The enclosed motor and clutch device of claim 12, further comprising:
    a coil mounting member non-rotatably mounted to the housing and having a pocket; and
    a bearing disposed in the pocket formed by the coil mounting member, the bearing rotatably receiving the motor shaft.

15. The enclosed motor and clutch device of claim 12:
    further comprising a coil mounting member non-rotatably mounted to the housing;
    wherein the coil is non-rotatably disposed on the coil mounting member.

16. The enclosed motor and clutch device of claim 15:
    wherein the coil is non-rotatably disposed on a first surface of the coil mounting member; and
    wherein the clutch rotor has a channel formed therein, and the coil is located in the channel.

17. The enclosed motor and clutch device of claim 12, further comprising a blade mounted on and rotatably driven by the output shaft.

18. The enclosed motor and clutch device of claim 12, wherein the brake surface is disposed on an interior surface of the housing.

19. A motor and clutch assembly, comprising:
    a housing comprising a first housing member and a second housing member, the first housing member comprising a first anti-rotation feature;
    an electric motor disposed in the housing;
    a motor shaft rotatably driven by the electric motor;
    a coil mounting member disposed in the housing and comprising a second anti-rotation feature, wherein the second anti-rotation feature engages the first anti-rotation feature to prevent rotation of the coil mounting member with respect to the housing;
    a electromagnetically energizable coil non-rotatably disposed on the coil mounting member;
    a clutch rotor disposed in the housing and rotatably driven by the motor shaft; and
    a clutch output shaft assembly comprising an output shaft rotatably mounted in the housing and a clutch brake disc,
    wherein the first anti-rotation feature comprises a plurality of slots formed on the first housing member and the second anti-rotation feature comprises a plurality of tabs formed on the coil mounting member, and each one of the plurality of tabs engages one of the plurality of slots.

* * * * *